US006785889B1

(12) United States Patent
Williams

(10) Patent No.: US 6,785,889 B1
(45) Date of Patent: Aug. 31, 2004

(54) SYSTEM AND METHOD FOR SCHEDULING BANDWIDTH RESOURCES USING A KALMAN ESTIMATOR WITH ACTIVE FEEDBACK

(75) Inventor: Peter Williams, NSW (AU)

(73) Assignee: Aurema, Inc., Cupertino, CA (US)

( * ) Notice: Subject to any disclaimer, the term of this patent is extended or adjusted under 35 U.S.C. 154(b) by 816 days.

(21) Appl. No.: 09/596,026

(22) Filed: Jun. 15, 2000

(51) Int. Cl.[7] ............................................. G06F 9/00
(52) U.S. Cl. ................... 718/104; 709/229; 709/240; 718/106
(58) Field of Search ............................. 709/104, 229, 709/240; 718/104, 106

(56) References Cited

U.S. PATENT DOCUMENTS

| | | | | |
|---|---|---|---|---|
| 5,881,238 A | * | 3/1999 | Aman et al. ................ | 709/226 |
| 6,003,062 A | * | 12/1999 | Greenberg et al. .......... | 709/104 |
| 6,105,053 A | * | 8/2000 | Kimmel et al. ............. | 709/105 |
| 6,189,022 B1 | * | 2/2001 | Binns ......................... | 709/100 |
| 6,263,358 B1 | * | 7/2001 | Lee et al. .................... | 709/100 |

* cited by examiner

*Primary Examiner*—Jack B. Harvey
*Assistant Examiner*—Hai V. Nguyen
(74) *Attorney, Agent, or Firm*—Michael Hetherington; Nick Ulman; Woodside IP Group

(57) ABSTRACT

A community of collaborative software agents works together in a domain to provide functionality such as provision of communications services or control of a chemical process. A scheduler is built into each collaborative agent which schedules tasks allocated to that particular agent and tasks sub-allocated by the agent. The scheduler has a mechanism for over-booking tasks for any one agent. It can also make tentative booking which can be overwritten of timed out.

7 Claims, 11 Drawing Sheets

The Kalman Loop

SYSTEM AND METHOD FOR SCHEDULING BANDWIDTH RESOURCES USING A KALMAN ESTIMATOR WITH ACTIVE FEEDBACK

REFERENCE TO COMPUTER PROGRAM LISTING APPENDIX

The following computer program listing including Universal Modeling Language (UML) diagrams showing instructions, regulation of work flow, the detailed design of the scheduler and relationships between objects in the computer program is submitted on a compact disc and is incorporated herein by reference:

| NAME | CREATION DATE | SIZE (bytes) |
| --- | --- | --- |
| Appendix A | Dec. 30, 2003 | 4.46 MB |

BACKGROUND OF THE INVENTION

1. Field of the Invention

The field of the invention relates in general to a scheduler for allocating digital device bandwidth resources. More particularly, the field of the invention relates to a system and method for allocating and scheduling digital device bandwidth resources among users and groups of users by using an active feedback estimator which guarantees a system bandwidth requirement among competing users and aggregate user groups.

2. Background

Computer Operating Systems are growing in complexity. Most new computers and devices using computational devices are performing many different tasks simultaneously. This sharing of resources affects machine performance and user satisfaction. Typically the operating system (OS) is responsible for scheduling when each process runs. When a process has reached its allotted time slice, or blocks for some reason, the OS saves its state and runs the next runnable process in the process queue. This gives the appearance of many different programs running simultaneously on a single processor. This is currently extended to multiple processors, which handle even more processes simultaneously. This in turn requires more programs demanding more system resources running simultaneously.

The two main process scheduling classes are real-time and time-sharing. Current process schedulers have a basic overall goal; to make the "system" more productive. The achievement of that goal requires the balancing of the following different requirements:

- allocate a fair share of CPU time to each process;
- keep the CPU busy 100 percent of the time;
- minimize the response time for time sensitive processes;
- minimize total job completion time;
- maximize total number of jobs per time unit.

To achieve this balance, schedulers make some assumptions about the type of processes that are running. The default system scheduler may frequently not be adequate to suit the application. Many scheduling algorithms and their implementations have been developed over the years to shore up deficiencies in attempts to build better schedulers.

Some operating systems use a two-level thread implementation, where threads within a process are first scheduled to a virtual processor which in turn are scheduled on the physical processors. Thus, the threads are bound to a particular virtual processor and the scheduling characteristics are resultants of the scheduling of the virtual processor.

The OS community has developed many optimal scheduling algorithms, but all algorithms are optimal only for certain workloads. There is currently no single solution that fits every system need. General-purpose operating systems face the problem of developing schedulers that are general enough to solve most needs, yet extensible enough to handle specific workloads.

There are many different algorithms for choosing the next process to run. Two of the most common scheduler algorithms are First-In-First-Out (FIFO) and Round Robin (RR).

FIFO runs each process until its completion and then loads the next process in the queue. FIFO can have negative affects on systems when processes run for an extended time, squeeze critical resources that otherwise keep the system stable to the point of no return, and then crash the system or initiate a sequence of events to crash the system.

Round Robin schedulers allow each process at a given priority to run for a predetermined amount of time called a quantum. When the process has run for the allotted time quantum, or if a higher priority process becomes runnable, the scheduler halts the process and saves its state. It is then placed at the end of the process queue and the next process is started. This may be the most optimal solution if the time quantum is longer than the average runtime of a process and the only resource needed is CPU bandwidth. These are very unlikely to be the case in the typical process load mix and therefore the need for a better algorithm to fill all requirements and to smooth out the workload over available resources. Also, context switching between different processes has a price and we much consider the overhead in context switching time of changing processes in conjunction with the more complex scheduling algorithms.

OS developers have created multilevel queue scheduling to meet the needs for different algorithms at different times. Multilevel queue systems have several algorithms used simultaneously. Each queue is assigned a priority over the next queue. The scheduler starts at the highest priority queue, implements the queue's algorithm until no runnable processes remain, and then proceeds to the next priority queue. One queue could use FIFO with another uses RR.

When implementing a conventional real-time scheduler, a problem known as priority inversion frequently arises. This occurs when a higher priority process is blocked waiting for a resource locked by a lower priority process. This problem has only partial solutions. One is by implementing a priority inheritance protocol. A process that "owns" a resource runs at the priority of the highest priority process that is awaiting that resource requested by a higher priority process. When the lock is released, the higher priority process becomes runnable and pre-empts the current process. This means that the algorithm selected can affect the performance of the application, and choosing the right algorithm can improve the system performance. What is needed is a system for setting priorities and quanta which are more likely to be the ones needed for the type of job mixes, users and applications which are presently emerging; and which will provide higher performance and more consistant service.

Whatever algorithm is used, changing the scheduling class of a server application, can guarantee that the server application will run before other applications and thus improve responsiveness for that particular application. However, this does nothing to guarantee that a particular application will only consume a specified portion of the CPU load, only that the application will be treated preferentially in allocating resources. What is needed is a way to track historic usage of an application or group of applications and guarantee that over a certain time period, the use of bandwidth resources is precisely that which was set initially, unless there is an available abundance of bandwidth, and no such constraints need be applied.

Process Schedule Configuration

The general purpose OS will not function if the scheduler is not configurable or even modifiable. Most OS vendors have compensated for this problem in several ways. Some provide utilities to view the default scheduling classes and allow changing the process priorities and quanta. In UNIX, these types of utilities have names like "nice", "sched_setscheduler" or "priocntl". Special privileges are generally needed to run a process at a higher priority or change the scheduler for a process from the real-time class or the time-sharing class. These generally manipulate the real-time dispatcher parameter table or time-sharing dispatcher parameter table. Servers and computers in general have grown bigger and more powerful.

Conventional solutions have thus grown disadvantageously larger in granularity and they lack the precision to handle the large resources that they command. The granularity of the changes can very often make precise goal achievement impossible with these solutions. What is needed are methods to allow users increased access to and more precise control over the allocation of CPU resources than is provided by the conventional "nice" and "priocntl" mechanisms. What is also needed are CPU and resource bandwidth scheduling utilities, applying the extension of the concept of share allocation down to threads and processes, thereby enabling users more precise control over the allocation of CPU access to these entities than is provided by the conventional "nice" and "priocntl" mechanisms.

Rescheduling is done to optimize resources and to increase performance for a particular job load mix or to improve the performance for a particular application. The changes are often done at the expense of other jobs in the mix, as they often take whatever resources are not being used by the preferentially treated application. As stated above, selecting the right scheduling algorithm for the particular situation is critical in satisfying competing needs and objectives. Managing resources fairly with overly constricting requirements, is a dynamic function currently done with static methods. What is needed is a way to improve control of the scheduler to manage bandwidth resources and provide precise mechanisms which are capable of more closely tracking load requirements.

Fair Share Schedulers

Fair Share schedulers emerged in the 1980's to provide a more equitable approach to dispensing system resources to a mix of users and groups of users. This led to several changes in approach to Time Sharing (TS) schedulers.

While it is the norm for schedulers to use decayed CPU usages, Fair Share's application of decayed resource usage in charging was a departure from traditional approaches. When a machine was solely for in-house use, the only need for a raw (undecayed) resource consumption tally is in monitoring machine performance and throughput and to observe patterns of user behaviour. The decayed usage is also normalized by the user's shares. One might view this as making the machine relatively cheaper to users with more shares. In essence, Fair Share schedulers attempt to keep the actual machine share defined by normalized usage the same as the machine entitlement defined by shares. From the user's point of view, Fair Share gives a decreased response to those who have utilized more than their fair share of resources. Thus, users see that as their normalized usage increases, their response becomes worse. (This assumes allowance is made for machine load.) This approach contrasts with conventional charging and scheduling systems that schedule processes equally. In the fixed-budget model, the users who consume their fair share, by emptying their budgets, get no resources, even if resources are available. In the extreme case, there may be no users because everyone who wants to use the machine has an empty budget. For an in-house machine, this does not make sense. Worse still, this conventional method can generate substantial administrative overhead as users seek extra allocations. The number of shares allocated to a user is, essentially, an administrative decision. However, in a situation where independent organizations share a machine, the shares that should be allocated to individual users depend both upon the entitlement that their organization has and on the individual's entitlement within the organization.

Additionally, charges in Fair Share (FS) are defined by the relative costs of different resources. For example, FS associates a charge with memory occupancy, another charge with systems calls, another with CPU use and so on. This is another difference between FS and conventional schedulers which define a process's scheduling priority only on the process's consumption of CPU time. In FS, CPU scheduling priority is affected by total resource consumption.

There are three types of activity at the process level:

activity associated with the activation of a new process;

the regular and frequent adjustment of the priority of the current process, and the regular, but less frequent decaying of the priorities of all processes.

The first activity occurs when a process relinquishes control of the CPU, or when the active process is interrupted for some reason, and at the regular times that the scheduler usurps the currently active process to hand control to the highest priority process that is ready to run. Next is the adjustment to the priority of the current process, which defines the resolution of the scheduler. This ensures that the CPU use of the current process decreases (worsens) its priority. Finally, there is the regular decaying of all process priorities, which must be done frequently compared to the user-level scheduler, but at a larger time interval than the scheduler's resolution.

Priority Adjustment in FS

At the finest resolution of the scheduler, the current process has its priority increased by the usage and active process count of the user who owns the process. Typically, schedulers increase the priority by a constant. Intuitively, one might view the difference between FS and typical schedulers as follows:

A typical scheduler adjusts the priority of the current process by pushing it down the queue of processes by a constant amount. In contrast, FS pushes the current process down the queue by an amount proportional to the usage and number of active processes of the process's owner, and inversely proportional to the square of that user's shares. Thus, processes belonging to higher usage (more active) users are pushed further down the queue than processes belonging to lower usage (less active) users. This means that a process belonging to a user with high usage takes longer to drift back up to the front of the queue. The priority needs longer to decay to the point that it is the lowest.

FS also needed users to be able to work at a rate proportional to their shares. This means that the charges they incur must be allowed to increase in proportion to the square of the shares (which gives a derivative, or rate of work done, proportional to the shares). This static formula approach also takes account of the number of active processes (processes on the priority queue) for the user who owns the current process. This was necessary since a priority increment that involved just usage and shares would push a single process down the queue far enough to ensure that the user gets no more that their fair share. If the user has more than one active process, FS needed to penalize each user to ensure that the user's share is spread between them and we do this by multiplying the priority increment by the active process count. This is the crux of the Share mechanism for making long term usage, over all resources that attract charges, affect the user's response and rate of work.

Depending on the priority queue length, FS process priorities can be small integers and so cannot be used directly. Such process priorities need to be normalized into a priority range that is appropriate for real process priorities. In addition, where the range in priority values is quite small, FS must ensure that the normalization procedure does not allow a single very large Share priority value to reduce all other normalized priorities to zero. To avoid this, FS defines a bound on the Share priority. This is calculated in the process-level scheduler. The FS priority bound does, somewhat unfairly, favor very heavy users. However, the heavy users suffer the effects of their slowly decaying large usage and they are treated more severely than everyone else.

The Fair share schedulers try to apply "fairness" by assigning priorities on historical usage of a process. The problem is that those Fair share schedulers employ less than robust methods in using the measured historical usage and therefore err considerably in the setting of process priorities. What is therefore needed is the use of a resource usage rate measure model the can estimate future usage and compare that directly with entitlements based on reservations and shares.

Recent market changes, advances in general computational devices and growth in market applications have also created the following needs which are not adequately met by conventional schedulers:

Guarantees must be provided to consumers when it is desired to ensure that resource use is fairly shared among clients according to the level of service that they have purchased.

New wireless applications and increased use of time based and bandwidth resources demand a greater level of system control over bandwidth resource allocation.

Therefore, what is needed is an improved system and method for balancing the foregoing additional needs in a scheduling process for managing resource usage. Preferably, such a scheduling system would allow the sharing of system bandwidth type resources on modern computer servers in new market applications which demand dedicated resources without robbing other system users. What is also needed is an increased level of system control over resource allocation such that the increased granularity of control can provide a more equitable distribution of designated bandwidth resources to processes across users and groups of users. Preferably, such implementations will be well defined and have a well behaved mathematical basis.

Although computing devices are becoming more powerful and need to managed differently between user groups, as with most operating systems and schedulers, bandwidth resource waste occurs if the job mix is not in tune with the scheduling algorithm. What is needed is a way to set priorities to satisfy demand in a manner which will not starve other processes and will not waste CPU cycles or other bandwidth resources.

With the increase in computing power also comes shrinking hardware demands with the need to support larger more complex applications and application combinations. For example, the merging of PDAs with cell phones, GPS, locators, music, radio, wireless apps, TDMA/CDMA, or the like. These trends demand more efficient usage of sophisticated applications working in tandem. What is needed is a method to generate more usage out of a computing system with various bandwidth resources, thereby providing a way for a smaller, more compact computing system to meet the demand equivalent of a larger less compact computing system employing a less efficient scheduler or loosely coupled schedulers.

SUMMARY OF THE INVENTION

An aspect of the invention provides an implementation of a digital device resource scheduler which determines the relative priority to be used when allocating resource service time to resource using entities.

The priorities produced by the scheduler can be used to increase the usage of entities that are receiving less than their entitlement and to decrease the usage of entities that are getting more than their entitlement. Provided that entities have sufficient demand to use their entitlement, the scheduler distributes resources fairly among entities according to their entitlement. An entity's usage may be calculated using Kalman filter techniques. Separate evaluations may be made depending on whether the entity has been receiving units of the resource. In this case, the decay and growth terms are totally independent of each other. The only information that may need to be retained for each entity is the value of the usage metric for that entity and the time at which it was last updated. Shares may be allocated to owners of the entities as well as the entities themselves. Thus, an entity's effective shares are adjusted by the ratio of the number of shares held by the owner that are allocated to that entity, to the total number of shares held by that owner. The shares allocated to individual entity are now effectively drawn from a separate pool of shares for each owner. Shares may be allocated to groups of owners, with or without the allocation of shares to individual owners.

An aspect of the invention also provides the ability to dynamically monitor and control a computer's critical system bandwidth resources such as CPU, Real & Virtual Memory, Bandwidth Allocation,or the like. Unlike passive systems, the invention scheduler continually and automatically compensates for changes in system usage/misuse in real time. An aspect of the invention directly alters the behavior of the Operating System to actively manage and change, rather than passively monitor and report, the precise allocation of CPU and other resources to defined users, collections of users, and applications.

BRIEF DESCRIPTION OF THE DRAWINGS

These and other features and advantages of the present invention will become more apparent to those skilled in the art from the following detailed description in conjunction with the appended drawings in which.

DESCRIPTION

Figure 1:
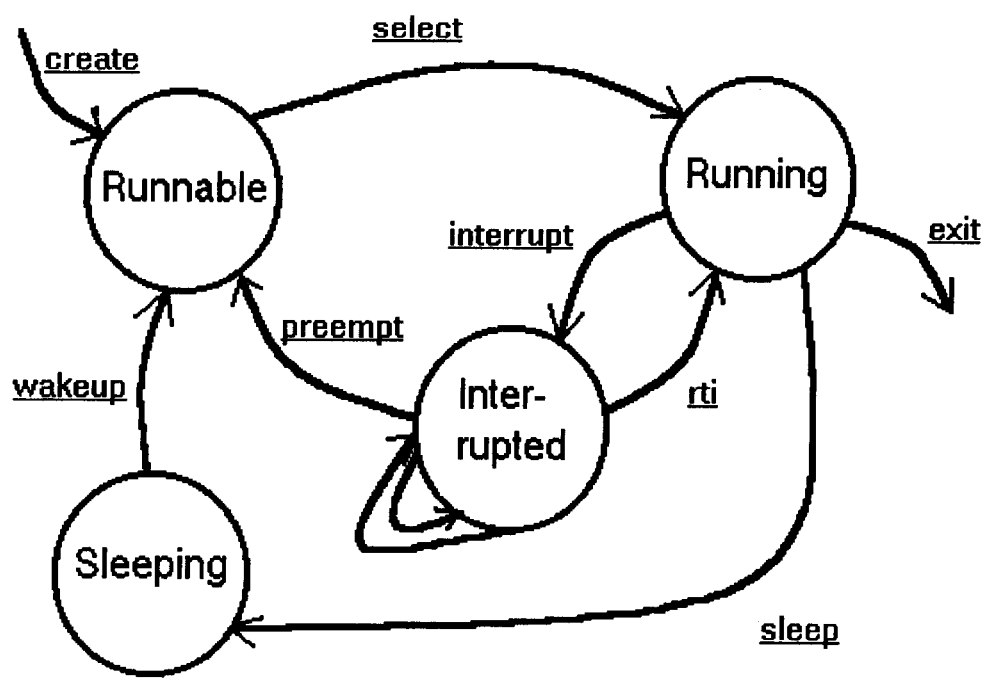
FIG. 1 shows a typical computer operating system process state transition diagram according to an aspect of the invention.

The invention is concerned with the component of a "bandwidth" resource scheduler that queues the "direct" consumers of that resource for access to it. Bandwidth resources are typified by a resource management mechanism that grants exclusive access to the resource for some period of time to "direct" resource consumers.

There are two types of resource consumer. "Direct" resources consumers and "indirect" resource consumers. When applied to CPU cycles, threads, or processes depending on the system, are "direct" consumers of CPU cycles. Users are an example of "indirect", via their threads and processes, consumers of CPU cycles.

An aspect of the invention allows fair sharing of access to the resource amongst "indirect" consumers as well as "direct" consumers. It does this by controlling the ordering of the consumer queue and in some cases, the length of access granted on each occasion.

In this context, fair sharing does not necessarily mean equal sharing but incorporates the concepts of "reservations" and "shares". A "reservation" allows the allocation of fixed proportions of the resource to high level, indirect, consumers. "Shares" are used to allocate the remaining resource, after "reservations" to other consumers on a proportional basis. "Shares" may be allocated to consumers at all levels and are hierarchically nested i.e. a "direct" consumer's shares entitle it to a proportion of its immediate owner's shares and so on.

As the resources are generally ephemeral in nature and valuable, when an entity is not generating sufficient demand to use its "reservation" or "share" the unwanted resource access is distributed amongst other entities in proportion to their "reservations" or "shares" so that there is no wastage of the resource.

An Embodiment of the Scheduler

The following embodiments of the invention are generic, and gloss over certain details of integration into specific operating systems. The invention scheduler has been integrated into several such operating systems and tested with excellent results. Aspects of the invention scheduler have proven to be superior to the existing schedulers in the areas for which they were designed to excel. For purposes of the following invention embodiments however, applications are ignored. Threads, also known as lightweight processes (LWPs), as the schedulable entities are likewise ignored in the description of the following invention embodiments, but it should be noted that the workings would be similar and their application as part and parcel in the invention provide a higher granularity of controlling processes, which is not possible in some existing schedulers.

In all the arrangements described the basic fair sharing is done at the entity level rather than the owner level and, if it is required, fair sharing amongst higher level entities is achieved by modifying the entity level fair sharing. The resulting scheduler is very flexible, allowing different types of sharing to be achieved by a single scheduler. Additionally, fair sharing amongst high level entities can be short term, long term or both. The selection between which type of fair sharing is in force can be made on a running system.

The type of high level entities among which fair sharing could be implemented is quite diverse and includes users, projects, processes and entity groups. In another aspect, as currently envisaged, it concerns a method of determining the relative priority to be used when allocating schedulable resources to an owner's share holding entity, by calculating:

(1) an entity's usage as the number of the resources indivisible units (ticks) that the entity is receiving per unit of time, that is a number between zero and the number of indivisible units that are available for consumption at each indivisible instant of time, (2) the entity's entitlement as a ratio of the product of the number of indivisible units that are available for consumption at each indivisible instant of time and the number of shares held by that entity at that time, to the total number of shares held by all live entities at that time, that is a number between zero and the number of indivisible units that are available for consumption at each indivisible instant of time, and (3) the entity's priority, at instants of time when there are more active entities than there are units available for consumption, in ascending order of their ratio of usage to entitlement, at that time.

Context

A typical computer system contains of one or more processors (CPUs), network bandwidth, main memory, other resources and one or more processes. At any moment in time a CPU can only be performing work by executing the instructions of a particular process. Each instruction takes a finite duration to perform. It requires an overhead elapse of time to change from having a CPU work for one process to working for another process, therefore it is normal to allow a process to use a CPU for a continuous run of instructions so that the scheduling overhead is small compared to the useful work performed.

In a TS computer system, there can be many more processes than CPUs, and yet it is desired that all processes should be able to make steady progress through their intended workloads. One factor, which assists in solving the problem of competition of the processes for CPUs, is that sometimes processes need to wait for an external event. Some examples of this are: delivery of a result to or from another process, human action at a keyboard or other input device, the elapse of an intended time delay, the arrival of a specific date and time, the transmittal of data to or from an external destination (screen, network, disk). A second factor involves perception: if a process is allowed to make progress in a rapid sequence of short bursts then this can appear to be continuous progress provided we don't look too closely and just regard the average rate of progress over a sufficiently long interval. Processes undergo state changes in their managed progression over the course of performing their primary objective while in a particular hardware environment. These typical high level state transitions are shown in FIG. 1.

A process, which never needs to wait, is said to be CPU-bound, it exhibits a demand of 1.0, and if given unobstructed access to a CPU it would use that CPU at 100% capacity continuously.

A process which sometimes waits (sleeps) for events exhibits a demand, which ranges from 0.0 to 1.0 depending on the frequency, regularity, and duration of those waits. Consider the occupation CPU by such a process: instantaneously, while it is running it has a demand of 1.0 and while sleeping a demand of 0.0; suppose, for example it does a perfectly regular cycle of running for 68 mS alternated with a sleep of 32 mS, if we inspect the run/sleep state enough times during any continuous 100 mS we will conclude that process has an average demand of about 0.68 (equally spaced or randomly selected sample points will give, statistically, the same result) and from the information given it can also be said that the 100 mS-average demand in this case is exactly 0.68. The same 0.68 demand will also be found if any sufficiently long duration of cycles is sampled (equally or randomly)—provided the duration is sufficient that any discrepancy due the partial first and last cycles sampled is dominated by the number of complete cycles between them.

If multiple processes are allowed to compete for use the same CPU, as in a TS system, there is an opportunity for each process to run while other processes are sleeping. However, it is not usually the case that the run/sleep cycles will mesh perfectly—at times they will all be sleeping and the CPU is idle, at other times multiple processes may become ready to run (runnable) but each runnable process cannot resume running immediately if the CPU is already occupied they will be delayed and hence will only complete their work at a slower average rate than if unobstructed. Unless special action is taken, any CPU-bound processes or processes which have appreciably long bursts of continuous running can greatly impair the provision of steady progress to other processes.

TS systems address this problem by imposing some upper limit (the time slice quantum, it may vary depending on circumstances) such that a process is preempted, and removed from control of a CPU if it runs continuously for more than a quantum so that other runnable processes (if any) may also have up to a quantum duration of running.

TS systems usually also associate an importance rating (niceness) with processes so that by varying the quantum and/or by making biased choices from among runnable processes which one will be given a quantum next, the more important processes may receive CPU at a rate averaging closer to their unobstructed demand than lower importance processes.

Processes or Schedulable Entities

A process is a collection of memory containing data and instructions for operating upon that data.

A process has a lifecycle: it is initially created by the actions of usually some other process, it then alternately runs and sleeps, until eventually it exits. The exit may be voluntary because all work for this process is complete, due to an error condition caused by the process, or by the action of another process.

The process is usually created in a runnable state. When a CPU is available it will be selected to run. While running the process may yield use of the CPU by exiting (upon request, or demand) or may go to sleep. While sleeping, some external event triggers the wakeup, which is transition to the runnable state. The process generally cycles around from Running to Sleeping to Runnable spending time mainly Running or Sleeping, or delayed in the Runnable state if another process currently has the CPU. The Interrupted state is transient: while a process is running it may be necessary for the system to temporarily use the CPU for a few moments to do actions such as updating a timer or completing a disk i/o; although the execution of process instructions is suspended they will be resumed as soon as the interrupt is completed, unless an additional decision is taken to preempt—the process is removed from the CPU but since it would continue running if it could, it is returned directly to the Runnable state. Interrupts may be nested, however it is always the originally interrupted process, which continues running unless the preemption is done. The work performed during Interrupt state need not be related to the work of the interrupted process however it is often counted as Running time for that process. We can mostly neglect the Interrupt state except that it is the means by which preemptions are performed.

Figure 2:
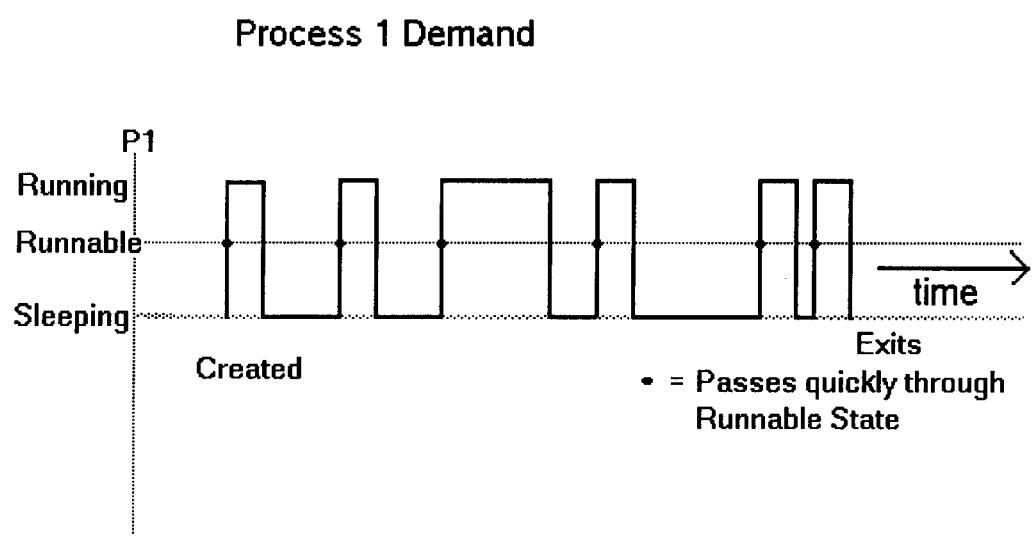
FIG. 2 shows the unobstructed state transitions timing diagram for a process in accordance with an aspect of the invention.

FIG. 2 shows the unobstructed state transitions timing diagram for a process, P1. Demand is either 1 or 0. This timeline show the demand curve for process P1. Notice that P1 has an unusually long burst of continuous demand at one point. This simple timeline for one process basically shows the demand load as a process switches from non-running to running states. This process changes dramatically as other processes, "the mix", are added to the run queue, the "runnable state". The delays which are introduced by the scheduler to produce equable sharing among runnable processes are also instrumental in distributing work among processes and available resources. These delays can come in the form of interrupts, sleep request, i/o requests or quantum expiration state changes. Switching processes among the states also carries a system burden and therefore system cost. Some available resource bandwidth will be wasted thru under utilization while others will not be able to service demand fast enough. It can be appreciated that a scheduler that can anticipate the myriad of factors to keep processes serviced and running without thrashing around between resources and processes will produce a system which is more efficient and more responsive.

Figure 3:
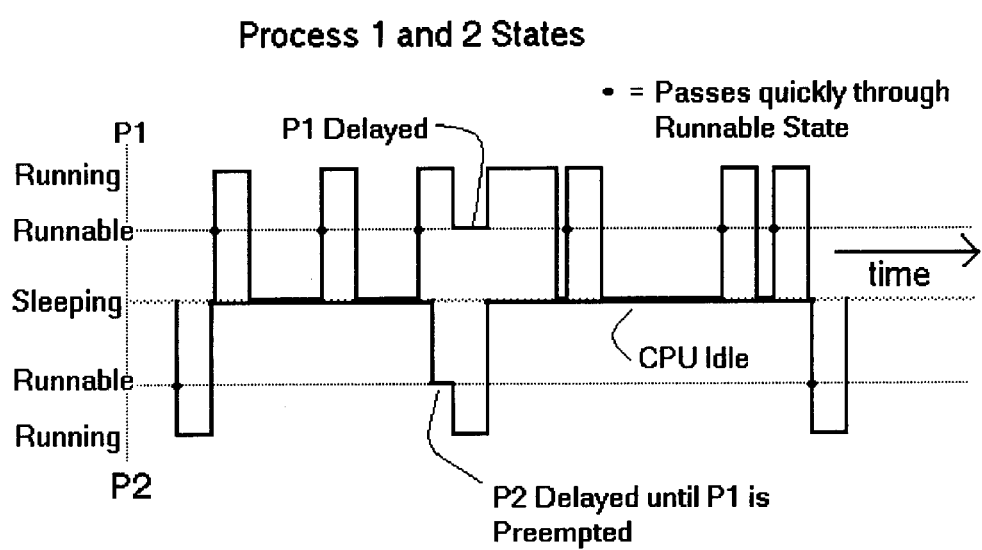
FIG. 3 shows a possible timeline for process P1 and P2 in competition for a CPU according to an aspect of the invention.

FIG. 3 shows a possible timeline for process P1 and P2 in competition for a CPU. It could be that P2 created P1. During a time when P1 in running, P2 also become runnable but is delayed until P1 can be preempted. As shown by the previous demand curve in FIG. 2, P1 would continue running but is now delayed while P2 has a turn. Once P2 goes to sleep, P1 completes the long burst of usage then continues normally. Meanwhile P2 is waiting, perhaps for the event that P1 has exited, when P1 exits P2 is again made runnable, runs and exits.

CPUs

Figure 4:
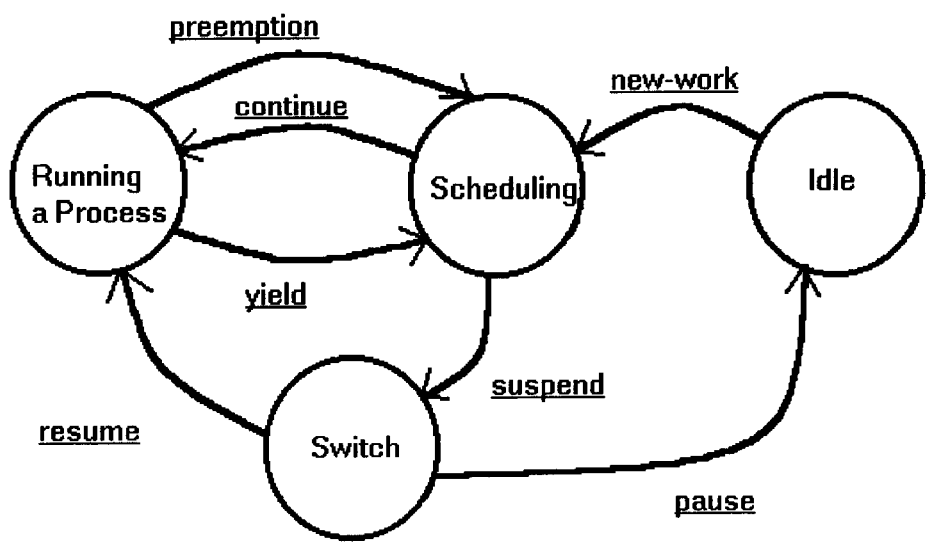
FIG. 4 is a high level diagram of the CPU activity of the state transitions.

Conventional scheduling can be viewed in the context of CPU function. FIG. 4 is a high level diagram of the CPU activity of the state transitions. For this simple embodiment, interrupt states are not shown. When certain events occur, a scheduling decision must be made: for example, in the Running a Process state, the current process using the CPU may go to sleep, or yield the CPU. Alternatively, control of the CPU may be preempted. From the Idle state, one or more processes are made runnable during interrupt processing. Scheduling examines the state of the previously running process (if any) and any currently runnable processes. The scheduler then does the following: continues running the previous process, return to the Idle state, or switches control of the CPU to a different process to run. This is the standard approach. An embodiment of the invention which is described in greater detail below takes a different approach in deciding which process will run next.

Dispatcher

In a TS system, the dispatcher is responsible managing the details of giving processes control of CPUs; for monitoring the duration of time spent running; for wresting the CPU from CPU bound processes at the end of a time slice quantum; and for selecting which runnable process will be run on a CPU when it becomes available. The dispatcher is also responsible for implementing any CPU affinity bindings, that is, in a multi-CPU system there may be constraints about which processes may or may not use which CPUs—when selecting a next process for a CPU it is just a matter of ignoring runnable processes which are ineligible due to affinity even if other data would indicate they are most deserving to be run next.

The dispatcher has involvement with each process state transition to or from the running state; and interacts with the scheduler in a cooperative manner to inform it of these events and to be influenced in the control actions that it makes.

Selecting a Process to Run and Giving it a CPU

The set of runnable processes is usually managed as a priority ordered, "run queue" (most Unix systems) or as an unordered list with an associated priority calculation function (Linux). In both cases, it is the scheduler, which provides the priority value. The Linux method means that there is less lag between when the priority is calculated and when it is used but it is unclear if this makes a practical difference or what the efficiency tradeoff is between repeated recalculation of a priority which may well have the same result and a lagged value; most schedulers also do an update scan of processes on the run queue to prevent marooning. Even Linux schedulers include an update, which adjusts one of the inputs to the priority calculation function.

A decision about how long the process will be allowed to run before preemption is usually made when the process is given a CPU. The dispatcher will either ask the scheduler for a time slice length and arrange for a preemption interrupt at that future point in time, or notify the scheduler that a time slice is beginning allow the scheduler to determine the interrupt.

If no eligible process can be found to be run then the dispatcher will either loop continuously looking for a process, use a specialized instruction to pause the CPU, which is still able to service interrupts, or give control to a dedicated lowest priority "idle" process. When some process becomes runnable due to an event notified via an interrupt, or by actions of another CPU, the idle CPU will be prompted to make another scan for runnable processes, find one, and select it. In the event of a process termination, the dispatcher will notify the scheduler of the exit and initiate deletion of any data structures involved in keeping track of the process lifetime. Since the CPU that was running the process that exits becomes available, the dispatcher will then search to select another process.

Monitoring Process CPU Usage

As mentioned above, some systems may use interval timing and an end of time slice interrupt to preempt a running process. The majority of systems use a more frequent clock interrupt (often 100 times per second, a "tick") to sample the running state of the interrupted process; this mechanism involves notification to the scheduler that the interrupted process was found to be running. By counting the tick reports the dispatcher or scheduler can arrange to preempt the process if it doesn't yield soon enough.

Preemption

The need to preempt a process arises when the process is observed to have reached the end of a time slice or the scheduler may provoke an earlier preemption because it knows a higher priority process has just rejoined the run queue. The process to be preempted is subjected to a forced interrupt so that dispatcher code can remove it from the CPU, make a fresh selection scan, and set the newly selected process running in a newly started time slice. It is possible that the preempted process and the newly continued process are the same; when they are not the same, the still runnable preempted process is returned to the run queue with a recalculated priority.

Scheduler

Although some implementations do not always make a clear division, it is possible to identify part of the overall dispatching and scheduling scheme which we term the Scheduler—it is involved with high level policy. The policy "controls" the dispatcher, but indirectly, mainly through the priorities assigned to runnable processes and also through timeslice lengths and preemption decisions to achieve a desired distribution of CPU availability to the competing processes.

Influencing selection of a process to run:
The scheduler influences the dispatcher selection of which process to run next through priority values assigned to the runnable processes. This assignment is either dynamic (e.g. in Linux calculated during the dispatcher selection scan(s)) or relies on a priority assigned whenever the process is placed on the run queue (e.g. at process creation, wakeup, or preemption); usually assigned with a regular low frequency update scan to avoid marooning.

When a process is selected to run:
A decision about how long the process will be allowed to run before preemption is usually made when the process is given a CPU. The dispatcher will either ask the scheduler for a time slice length and arrange for a preemption interrupt at that future point in time, or by notifying the scheduler that a time slice is beginning allow the scheduler to determine an interrupt.

Dealing with a process creation:
The scheduler plays a part in process creation so that it becomes aware of the new process (child) and the relationship of it to the parent process, which spawned the new process. Some scheduler related characteristics of processes are inherited from parent to child. The scheduler must assign an initial priority to the runnable child and for memory performance reasons is usually expected to influence whether the parent or child runs first immediately after the spawn.

Dealing with a process exit:
Delete any data structures involved in keeping track of the process lifetime. If accounting for usage, it may also be appropriate for the scheduler to accrue the partial timeslice, which ends with the exit.

Monitoring process CPU usage:
As mentioned above, some systems may use interval timing and an end of timeslice interrupt to preempt a running process. The majority of systems use a more frequent clock interrupt (often 100 times per second, a "tick") to sample the running state of the interrupted process; this mechanism involves notification to the scheduler that the interrupted process was found to be running. By counting the-tick reports the scheduler can arrange to preempt the process if it doesn't yield soon enough.

Dealing with a process that yields:
The dispatcher notifies the scheduler that the process is going to sleep. The scheduler may use this moment as a convenient point in time to account for the early end of the time slice, which the process was part way through.

Preemption:
The need to preempt a process arises when the process is observed to have reached the end of a time slice or the scheduler may provoke an earlier preemption because it knows a higher priority process has just rejoined the run queue. The process preempted is subjected to a forced interrupt and once removed from the CPU will be replaced in the run queue. When notified of the preemption, the scheduler can use this as the actual moment at which the process time slice ends.

Wakeup:

When a process wakes, it must be first returned to the run queue and this implies the need for a priority calculation to position the process correctly among other runnable processes.

Sharing:

A key feature of the present invention scheduler that differentiates it from other fair share schedulers is that basic fair sharing is done at the process level rather than the user level and that, if it is required, fair sharing among higher level entities is achieved by modifying the process level fair sharing. The principal benefit provided by this configuration is that the resulting scheduler is very flexible, allowing different types of sharing to be achieved by a single scheduler. Additionally, fair sharing among high level entities can be short term, long term or both. The selection between which type of fair sharing is in force can be made on a running system. The type of high level entities among which fair sharing could be implemented is diverse and includes users, projects, groups and process groups.

In contrast to conventional TS schedulers, an aspect of the invention considers the aggregate demand of multiple processes and enables a hierarchical approach to scheduling. Aggregation implies a need to classify processes so that those which have the same classification can be counted together as an aggregate entity (AE). If multiple classifications are made, then the processes can be aggregated in a nested hierarchy of AE types. The data used for classification can be any of: the observed behavior of processes, observable attributes of the process, requests from the process or other sources to deem a particular classification for a given process(es), inheritance of classification from a process to processes that it creates, combinations of these methods including rule-based approaches.

Classification may be determined dynamically, from time to time in response to particular events, or set once upon first discovery of the process. Thus an aspect of the invention provides the advantage of creating accounting entity hierarchies which are used to provide a mechanism for dynamic classification at a finer granularity.

Figure 5:
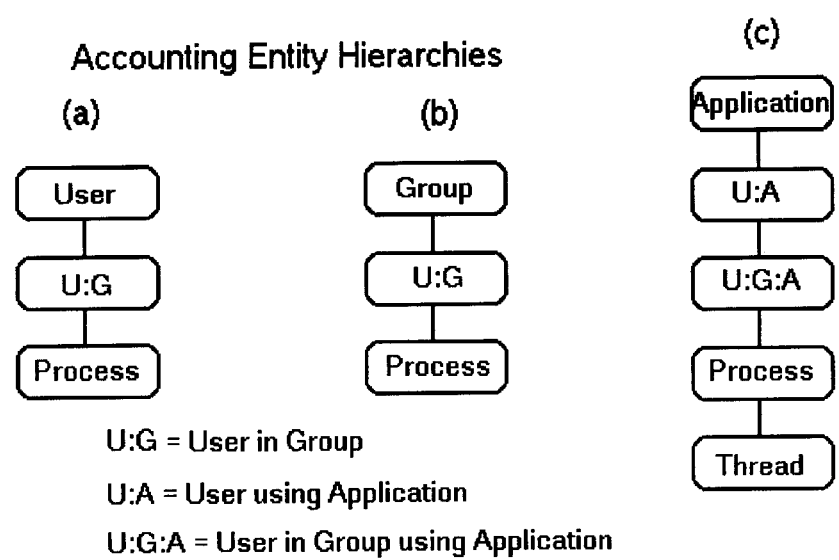
FIG. 5 is a simplified block diagram illustrating the structure policy hierarchies.

FIG. 5 is a simplified block diagram illustrating the structure of various accounting entity hierarchies. In (a) and (b), we suppose that each process can be regarded as being owned by a particular user; and that users may act within one or more groups a process can also be regarded a member of a group. Thus, each process belongs to a particular "U:G" classification (a RUE)—the set of possible RUEs is the cross product of the set of Users and the set of Groups. RUEs can in turn be aggregated according to User (as in (a)) or Group (as in (b)).

Hierarchy (c) shows a more complete possibility, here each process may use a number of threads to perform work (Threads are thus the real consumers of CPU capacity)—a thread belongs to the process wherein it was started; and additionally an Application classification applied to processes leads to a three-way cross product for the set of possible RUEs.

Hierarchy (a) is sufficient for explanation of how An aspect of the invention scheduling works: the low level AEs, Processes, are the CPU capacity consumers; above Processes are RUEs—each RUE is the collection of processes with a particular classification of User and Group; the high level AEs represent RUEs aggregated by User—each User AE is the collection of processes of a User regardless of Group classification.

Figure 6:
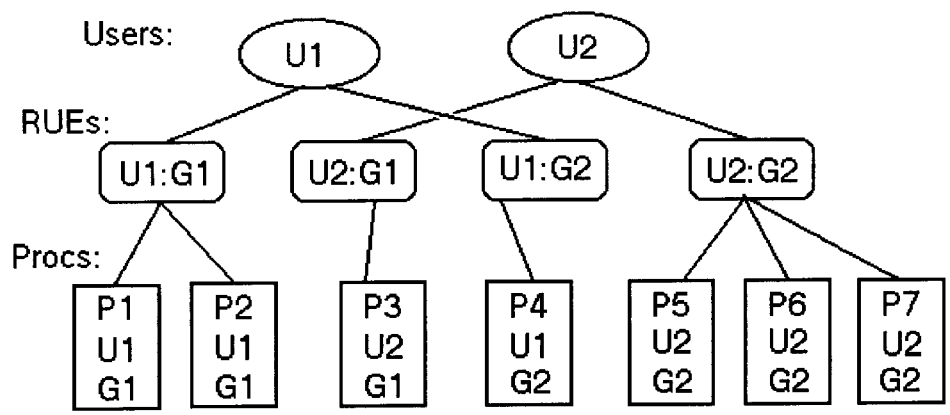
FIG. 6 is a simplified diagram illustrating a simple accounting entity hierarchies example.

FIG. 6 is a simplified diagram illustrating a simple accounting entity hierarchy's example. In FIG. 6 is shown that there are seven processes owned by two users acting in two groups, and using classification hierarchy (a) as defined in FIG. 5 above. The following entity hierarchy serves to illustrate an example of scheduler's operation in managing the process of sharing resources among entities and the need for and aspect of the invention.

First, in the case when all processes have CPU-bound demand, under normal TS, the system will distribute CPU capacity, in time slice quanta, in rotation, between the seven processes. This results in 14.3% of capacity used by each process if they all have equal niceness; under the same assumptions if the number of such processes increases or decreases the available CPU capacity is divided equally between N processes each receives (100/N) %. If processes are given non-default niceness then they receive more or less than an equal portion in a way which is difficult to calculate or describe here as it is outside the scope of this embodiment. It can be said that processes competing at equal niceness will receive equal portions. There is no bias to the distribution of CPU based on classification.

Under a sharing TS scheduler, we wish to control the portion of CPU given to each process classification, based on some policy which views the different classifications as being more or less important or deserving of receiving a portion of the scarce resource: CPU capacity. This is sometimes termed Fair Sharing although it is meant to signify equal sharing.

Suppose, in the above Seven Process scenario of FIG. 6, the policy provides as a first consideration, that each U is equally entitled to CPU, next that each RUE of a U is equally entitled to share in that U's share, and finally that each process of a RUE is equally entitled to share in that RUE's share. For the given mix of processes and their classifications, local entitlements can be calculated for each User, RUE and Process—each local entitlement is the fraction of the entitlement above it which each AE deserves. The CPU Share, which devolves to each process, is the product of the local entitlements above it. These are all tabulated and shown in Table 1.

TABLE 1

| User | U1 | | | U2 | | |
|---|---|---|---|---|---|---|
| U entitlement | 0.5 | | | 0.5 | | |
| RUE | U1:G1 | U1:G2 | U2:G1 | U2:G2 | | |
| G entitlement | 0.5 | 0.5 | 0.5 | 0.5 | | |
| Process | P1 P2 | P4 | P3 | P5 | P6 | P7 |
| P entitlement | 0.5 0.5 | 1 | 1 | 0.33 | 0.33 | 0.33 |
| CPU Share | 0.125 0.125 | 0.250 | 0.250 | 0.083 | 0.083 | 0.083 |

If a process is removed from contention, then according to the policy there is only a localized rebalance of entitlements. In Table 2 therefore, P7 is removed which increases the portion due to P5 and P6:

TABLE 2

| User | U1 | | | U2 | |
|---|---|---|---|---|---|
| U entitlement | 0.5 | | | 0.5 | |
| RUE | U1:G1 | U1:G2 | U2:G1 | U2:G2 | |
| G entitlement | 0.5 | 0.5 | 0.5 | 0.5 | |
| Process | P1 P2 | P4 | P3 | P5 | P6 |
| P entitlement | 0.5 0.5 | 1 | 1 | 0.5 | 0.5 |
| CPU Share | 0.125 0.125 | 0.250 | 0.250 | 0.125 | 0.125 |

The rebalance is more widespread when the last process of a RUE, e.g. P3 is shown removed in Table 3 below.

TABLE 3

| User | U1 | | | U2 | |
|---|---|---|---|---|---|
| U entitlement | 0.5 | | | 0.5 | |
| RUE | U1:G1 | | U2:G1 | U2:G2 | |
| G entitlement | 0.5 | 0.5 | | 1 | |
| Process | P1 | P2 | P4 | P5 | P6 |
| P entitlement | 0.5 | 0.5 | 1 | 0.5 | 0.5 |
| CPU Share | 0.125 | 0.125 | 0.250 | 0.250 | 0.250 |

Likewise, when the last process of a User is removed, the local U entitlement of all remaining Users rises, and consequently so does the CPU Share of each remaining process. Conversely, if processes are added to the mix or existing processes change from one classification to another corresponding reassignments of the local entitlements according to the policy, leads to a corresponding allocation of CPU portions for the processes.

Since processes are the CPU consumers, it is always necessary to have some policy for allocating CPU portions between them. However, it is not necessary to apply the above hierarchical entitlement scheme at all levels or uniformly across a level, even if full classification is still performed for accounting purposes. If the RUE basis for sharing is removed from the policy statement we get the results found in Table 4 below.

TABLE 4

| User | U1 | | | U2 | | | |
|---|---|---|---|---|---|---|---|
| U entitlement | 0.5 | | | 0.5 | | | |
| RUE | U1:G1 | U1:G2 | U2:G1 | U2:G2 | | | |
| Process | P1 | P2 | P4 | P3 | P5 | P6 | P7 |
| P entitlement | 0.33 | 0.33 | 0.33 | 0.25 | 0.25 | 0.25 | 0.25 |
| CPU Share | 0.165 | 0.165 | 0.165 | 0.125 | 0.125 | 0.125 | 0.125 |

If the policy only excludes RUE sharing for U2, we get the results shown in Table 5 below.

TABLE 5

| User | U1 | | | U2 | | | |
|---|---|---|---|---|---|---|---|
| U entitlement | 0.5 | | | 0.5 | | | |
| RUE | U1:G1 | U1:G2 | U2:G1 | U2:G2 | | | |
| G entitlement | 0.5 | 0.5 | | | | | |
| Process | P1 | P2 | P4 | P3 | P5 | P6 | P7 |
| P entitlement | 0.5 | 0.5 | 1 | 0.25 | 0.25 | 0.25 | 0.25 |
| CPU Share | 0.125 | 0.125 | 0.250 | 0.125 | 0.125 | 0.125 | 0.125 |

Thus, one may state a policy saying that U2 is twice as deserving as U1 and that any G2 use is half as important as G1 use; but again with the full hierarchy operative and still equal sharing between processes of identical classification. This leads to the Table 6 results below.

TABLE 6

| User | U1 | | | U2 | | | |
|---|---|---|---|---|---|---|---|
| U entitlement | 0.3333 | | | 0.6667 | | | |
| RUE | U1:G1 | U1:G2 | U2:G1 | U2:G2 | | | |
| G entitlement | 0.6667 | 0.3333 | 0.6667 | 0.3333 | | | |
| Process | P1 | P2 | P4 | P3 | P5 | P6 | P7 |
| P entitlement | 0.5 | 0.5 | 1 | 1 | 0.333 | 0.333 | 0.333 |
| CPU Share | 0.111 | 0.111 | 0.111 | 0.444 | 0.074 | 0.074 | 0.074 |

Shares

The use of Shares to express entitlement policy has been used in a number of Fair Share schedulers and is also used in an aspect of the invention as well. The difference with the use of shares in an aspect of the invention and previous schedulers is that shares are also used at the process level and therefore distinguished here as a marked improvement. Shares are a convenient way to express policy about proportioning of entitlement between entities. The local entitlement of an entity among a set of sharing peers is the ratio of the shares for the entity to the sum of shares for the set of sharing peers.

For example, the policy represented in the entitlements in the scenario above can also be represented by shares. Note that share numbers shown in Table 7 below only need be commensurate among each set of sharing peers.

TABLE 7

| User | U1 | | | U2 | | | |
|---|---|---|---|---|---|---|---|
| U Shares | 100 | | | 200 | | | |
| RUE | U1:G1 | U1:G2 | U2:G1 | U2:G2 | | | |
| G Shares | 66 | 33 | 2 | 1 | | | |
| Process | P1 | P2 | P4 | P3 | P5 | P6 | P7 |
| P Shares | 10 | 10 | 1 | 1000 | 200 | 200 | 200 |
| CPU Portions | 0.111 | 0.111 | 0.111 | 0.444 | 0.074 | 0.074 | 0.074 |

Provided additional processes, RUEs, or Users are assigned equivalent numbers of shares when they are added to the above scenario, the sharing policy is preserved. Likewise if processes and their shares are removed along with those of any resulting process-less RUEs or Users.

Usage Measurement and Feedback to Priority

Figure 7:
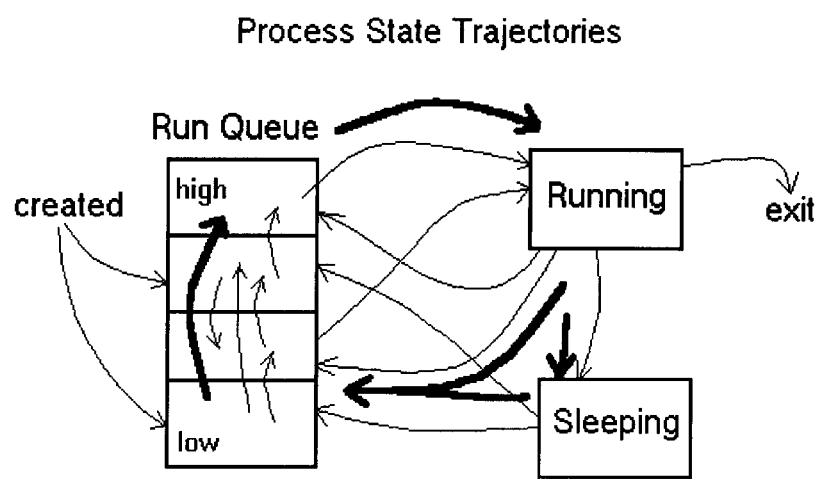
FIG. 7 is a simplified diagram example illustrating the possible state trajectories to and from the scheduler run queue.

FIG. 7 is a simplified diagram example illustrating the possible state trajectories to and from the scheduler run queue. The runnable state 709 for a process has finer detail which is the position or priority of the process or entity while it is delayed on the run queue 709, before the dispatcher selects it to run. Depending on the scheduler, a newly created process may first join the run queue 709 at potentially any level. The number of priority levels may be any convenient number, and typically an even number.

Until it eventually exits 703, the process circulates from the run queue, to running state 701, then back to the run queue 709 with a possible sojourn in the sleeping state 705 for this simple embodiment. While delayed in the run queue and depending on scheduler actions, the process may move up or down the priority levels until it is selected to run. The priority at which the process rejoins the run queue and the priority it has when selected to run may be anywhere in the priority range. The trajectories 707 will vary depending on many factors and some of the complexity in ascertaining the optimal trajectories and the possible scenarios are included as further aspects of the scheduler according to the invention which are covered in more detail below.

While a process is delayed in the run queue, most schedulers will increase the process priority over time so that it does not become marooned by the continual arrival of higher priority processes. So most priority transitions in the run queue tend to be upwards; but this does not preclude possible downward moves under certain circumstances. The priority aging may be stratified so that, for example, there are reserved bands of priorities at the high and low ends with most ordinary processes constrained to a middle band. The high band processes will then be run as soon as possible and therefore as fast as possible, receiving as much available CPU capacity as possible up to their demand; the low band processes will run only when there is spare CPU capacity not demanded by any higher process.

The scheduler has no influence over the duration of a sleep. The scheduler has only indirect control over the duration of time a process is delayed in the run queue—this depends on the mix of other process priorities in the run queue, and if currently running processes sleep or have to be preempted.

The future demand pattern of a process is usually not known—process behavior can change over time as it moves through different phases of work. The demand pattern often also depends on external events which have variable timing. The fact that a process previously yielded before elapse of a time slice may be used to guess that the process will continue to behave at less than 100% demand, but there is no guarantee of this. The fact that a process ran until it was preempted may imply that it is truly CPU-bound or just that the assigned quantum was shorter than some natural amount of work that the process does between sleeps. Some processes exhibit highly regular simple periodic demand patterns, others may have complex patterns resulting from a summation of multiple underlying simple periodic demand. The periods have a wide range, from microseconds to days. Still other processes are best described as having unpredictable or chaotic demand, especially when viewed over a fine timescale.

The choice of time slice quantum has two opposing considerations: for processes with high demand, longer quanta give better utilization of the CPU hardware (memory "cache" warmth) and reduced overheads due to the switching between processes; when interactive processes are present short quanta give improved responsive feel.

Figure 8:
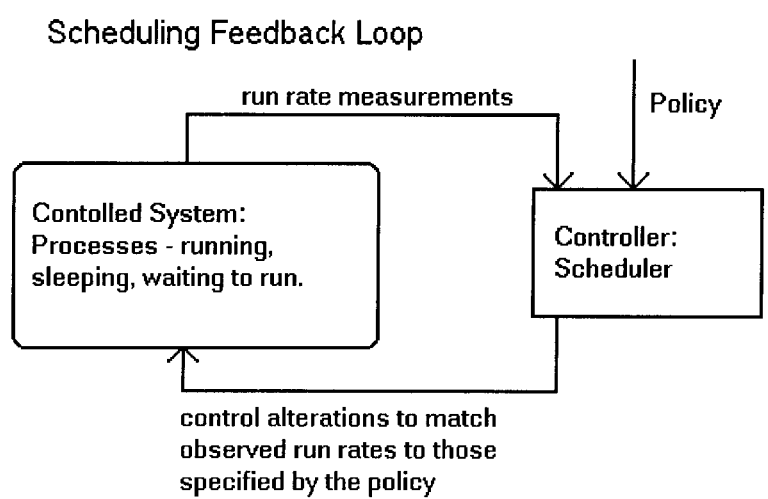
FIG. 8 is a high level block diagram illustrating the scheduling feedback loop.

Accordingly, an aspect of the invention provides a solution to a major problem of TS scheduling concerns; namely how to orchestrate priority assignments, time slice quanta, and preemption so that the run rates of a mix of processes with complex and diverse demand patterns are controlled according to a given TS policy. FIG. 8 is a high-level block diagram illustrating a scheduling feedback loop. This feedback loop of the invention plays a central role in changing the behavior of the present scheduler to solve the problem of setting appropriate process priorities.

An aspect of the present scheduler uses a feedback mechanism to try to match an entity's usage of CPU resources with its entitlement to CPU resources. In order to do this, both a well behaved metric for the entities resource usage and a method to determine its entitlement are required. An aspect of the current invention presents a novel bandwidth resource usage metric and mathematically rigorous means for determining entitlement under various bandwidth resource sharing policies.

Another aspect of the present invention uses a state estimator function to reconstruct state information from measured usage of prior cycles, thereby generating a single variable estimate for each entity's future demand for resource bandwidth. The Kalman estimator is employed to aid prediction of what priority to set each process in order to meet its shares and resource entitlements as well as to meet all the other competing objectives in a in a timely fashion. The invention scheduler uses active feedback in the a Kalman filter to calculate entitiy priority values for processes in the run queue based on anticipated usage, allotted shares of bandwidth resources and current usage rates. Thus, the predictive nature of the usage metric model in conjunction with the timely measured usage and policy resource allocation numbers for entities in the entity hierachies, provide a means for generating relative process priorities which smooth bandwidth usage load.

Measured Run Rate

The following rigorous mathematical example concerns the allocation of a bandwidth resource, namely CPU ticks, to processes in which the following terms are given special meanings as indicated:

active processes are processes that are either currently being run by a CPU or are on a run queue awaiting processing by a CPU.

live processes are processes that are capable of consuming CPU resources. They are not necessarily active but may be asleep or otherwise incapable of running. All active processes are live processes.

active users or groups are users or groups that own active processes.

A critical aspect of the invention scheduler is the application of a Kalman filter for estimating the value of a scalar quantity. Some particular assumptions and simplification of a Kalman filter presented in this embodiment have been made to reduce the Kalman filter to a bare minimum for estimating the value of a scalar metric using a constant covariance matrix and can be described by the following paragraphs below.

A Stable Usage Metric

When reduced to the bare minimum the Kalman filter for estimating the value of a scalar quantity using a constant covariance matrix can be described by the following equation $$\bar{x}_i = \bar{x}_{i-1} + \kappa(x_i - \bar{x}_{i-1}) \qquad (1)$$

where $\bar{x}_n$ is the estimate of the scalar value after n samples, $x_n$ is the n th sample measurement, $\kappa$ is a damping factor such that $0 \leq \kappa \leq 1$ and $\bar{x}_0 = 0$. Because when $\kappa=0$ then $\bar{x}_n=0$ for all n and when $\kappa=1$ then $\bar{x}_n = x_n$ for all n other than zero, the limits on the value of $\kappa$ need to be changed to $0 < \kappa < 1$ for practical systems.

When the scalar quantity being estimated is a constant the value of $\bar{x}_n$ asymptotically approaches the value of that constant as n increases. Suppose that all measurements are exact then after n measurements the difference between the estimate and the true value of the scalar is given by the relation $$\bar{x}_n = \gamma(1 - (1-\kappa)^n) \qquad (2)$$

where $\gamma$ is the true value of the scalar. (In the case where the measurements contain small random errors this relation changes to approximate equality rather than exact equality.) The difference between the estimate of the scalar's value and the true value halves every $\ln \frac{1}{2} / \ln(1-\kappa)$ samples and this value is known as the filter's response half-life. After some time the difference between the estimate and the true value becomes negligible and the filter is said to be stable. In the case where a filter such as that described in Equation 1 has already stabilized on an estimate of a scalar value and that value changes, the response of the filter to the change is the same as that described in the previous paragraph. That is, the difference between the estimate of the new value of the scalar and its actual value halves every $\ln\frac{1}{2}/\ln(1-\kappa)$ samples. With a suitable value for $\kappa$, filters of this type are quite useful for estimating the current value of a scalar whose value is changing over time with a very low overhead in the amount of memory required.

Additionally, filters of this type are well behaved and the values of the estimate are bounded below by zero and above by the largest measured value. For these reasons Equation 1 has been chosen as the basis for the bandwidth resource usage in general and in this specific embodiment, CPU usage.

The quantity that the CPU usage metric is required to measure is the amount of CPU time, in CPU ticks, that some entity is receiving per unit of time. Because of the unusual nature of this quantity the CPU usage metric will not strictly speaking be a Kalman filter, but it will behave like one. In particular, it will be well behaved with well defined limits and its responsiveness will be predictable.

By making the simplifying assumptions that the entity whose CPU usage is being estimated is a process and that the system is not threaded (i.e. the process can receive at most one CPU tick during any time period of one tick duration), replacing the term $(1-\kappa)$ by $\alpha$, replacing $\bar{x}_n$ with the usage $\bar{v}_n$ metric and reordering Equation 1 the equation $$\bar{v}_i = \alpha \bar{v}_{i-1} + (1-\alpha)\rho \qquad (3)$$

where $\rho$ is the proportion of a CPU tick received by the process during the period of time between the (i−1)th and ith samples. If these samples are taken one tick apart the units of $\bar{v}_i$ will be ticks per tick and the relation $$0 \leq \bar{v}_i \leq 1 \qquad (4)$$

will describe the bounds of $\bar{v}_i$ and the half life response time for the metric will be $\ln\frac{1}{2}/\ln\alpha$ ticks.

The requirement to take a sample every tick for each entity is quite onerous but, due to the fact that the typical entity will generally go for a number of ticks without receiving any CPU ticks and then receive several ticks at once (its time slice), the sampling requirement can be considerably lightened. If the constant $\rho_c$ is used to replace the variable proportion and $\rho$ Equation 3 is expanded and simplified, the equation $$\bar{v}_{i+n} = \alpha^n \bar{v}_i + (1-\alpha)\rho_c \sum_{j=0}^{n-1} \alpha^j \qquad (5)$$

can be derived to calculate the usage metric after n constant measurements of value $\rho_c$. By noticing that the summation term in this equation is the geometric series and that $$\sum_{j=0}^{n} \alpha^j = \frac{1-\alpha^{n+1}}{1-\alpha} \qquad (6)$$

further simplification leads to the equation $$\bar{v}_{i+n} = \alpha^n \bar{v}_i + \rho_c(1-\alpha^n). \qquad (7)$$

When an entity has endured a period of n ticks without receiving any CPU ticks the substitution $\rho_c=0$ can be made in Equation 7 to give the equation $$\bar{v}_{i+n} = \alpha^n \bar{v}_i \qquad (8)$$

as a means of determining the current CPU usage metric in terms of the value of that metric at the start of the period of CPU tick drought (the famous exponential decay equation). Similarly, when the entity has just received n whole ticks the substitution $\rho_c=1$ can be made leading to the equation $$\bar{v}_{i+n} = \alpha^n \bar{v}_i + (1-\alpha^n) \qquad (9)$$

as a means for determining the current CPU usage metric in terms of the value of that metric at the start of a sequence of n whole CPU ticks received by the entity. To further generalize, take the case where an entity receives n whole ticks and a portion of a tick equal to $\rho$ where $0 \leq \rho \leq 1$ with the last being received in the mth tick after some arbitrary time and the usage metric was last updated in the lth tick after that same arbitrary time and $1 \leq m$. In these circumstances, the equation $$\bar{v}_m = \alpha^{m-1}\bar{v}_l + (1-\alpha^n) + (1-\alpha)\rho \qquad (10)$$

holds giving a general method for calculating the CPU usage metric that only needs to be applied at the end of receipt of series CPU ticks.

At the beginning of the derivation of Equation 10 the simplifying assumption that the entity receiving CPU ticks could receive at most one CPU tick during each time period of one tick duration was made. Clearly this assumption will not hold for multi threaded processes (or users) on systems that have more than one CPU (if that isn't an oxymoron). Although no formal proof has been attempted, extensive numerical experimentation has shown that when separate applications of Equation 10, when and as ticks are received, are made for each CPU the resultant metric is stable. It has a response time equal to $\ln\frac{1}{2}/\ln\alpha$ and the relation $$0 \leq \bar{v}_m \leq N_c \qquad (11)$$

holds (for all m) where $N_c$ is the number of CPUs on line. Further, in the stable state, the value of the metric is an accurate measure of the number of CPU ticks that the entity is receiving per tick. The fact that the decay and growth terms in Equation 10 are totally independent of each other is the prime reason for this desirable behaviour.

The function $Y_S(s, t)$ is defined as a function that returns the usage metric for the instance s of an entity drawn from the set of entities S at time t. For any given set of entities S a common damping factor $\alpha_S$ is used and this means that the only information that must be retained for each entity s is the value of the usage metric $\bar{v}_{\tau_s,s}$ for that entity and the time at which it was last updated $\tau_s$. The definition of $Y_S(s, t)$ then becomes $$Y_S(s, t) = \alpha_S^{t-\tau_s} \bar{v}_{\tau_s,s} \qquad (12)$$

(see Equation 8) where $\bar{v}_{\tau_s,s}$ and $\tau_s$ are updated as and when s receives CPU ticks using Equation 10.

Process Run Rates

Figure 9:
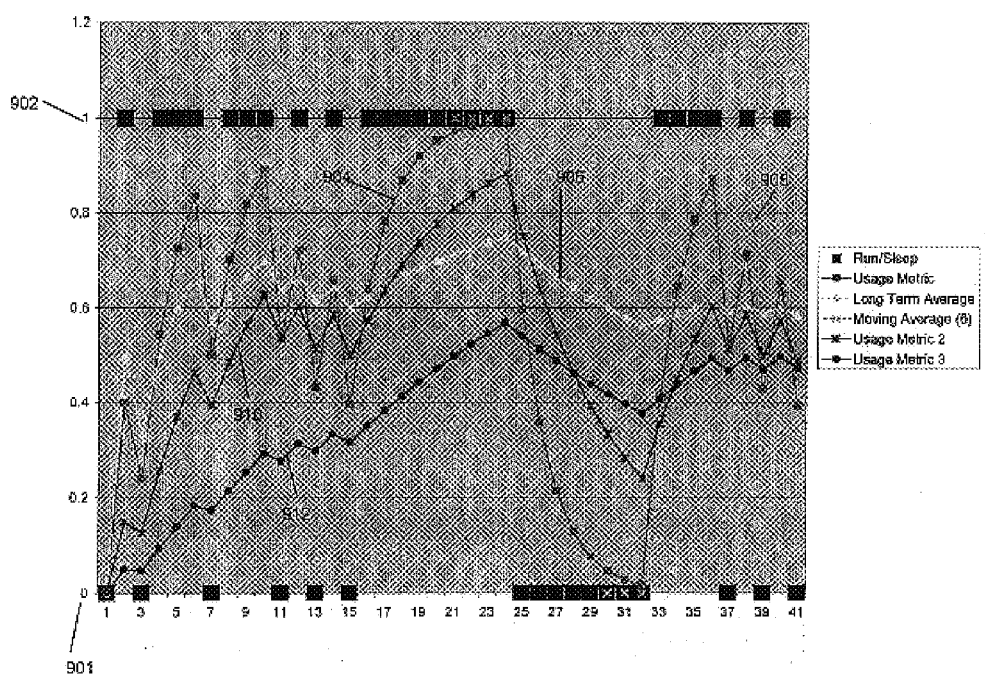
FIG. 9 is graphical representation illustrating process run rates parametrically.

FIG. 9 is graphical representation illustrating the process run rates. For the figure scenario in FIG. 7 we wish to measure the run rate of a process with a variable Run/Sleep behavior. The square Run/Sleep markers are at 1 902 when the process is running 701 and when at 0 901 when the process is not running. On the horizontal axis, the chart shows 41 units of time, sometimes called ticks. At time 16 the process becomes CPU bound for a while, then rests (time 25 to 32), and finally resumes a pattern similar to the behavior at times 8 to 15. In the following discussion we define: $R_t=1$ if the process run for time t and $R_t=0$ if it did not.

The Long Term Average 906 (at time T:

$$\left(\sum_{t=1}^{T} R_t\right)/T)$$

has settled at just below 0.6 at time 41 because the process has been running for 26/41 or 58.5% of the time. Notice how the Long Term Average 906 becomes increasingly unresponsive to the shorter-term variations in R. This metric is of no particular use for making short-term decisions; the averages for processes, which started at different times, should not be compared.

A moving average 908 (the chart shows a six time unit moving average, at time T:

$$\left(\sum_{t=T-5}^{T} R_t\right)/6,$$

valid for T≧6) gives a better idea of the short term trend behavior of R, however it can be expensive to compute because N samples of history have to be maintained per process to calculate the N unit moving average. Alternate process run rates are shown 904 910 912 using different usage metrics illustrating the affects of usage metrics on run rate response or lack thereof. The reader will appreciate that the usages exhibit no over or undershoot in achieving their allocated bandwidth resources, CPU usage in the case of this embodiment. This aspect of the invention is expounded to greater depth below.

Figure 10:
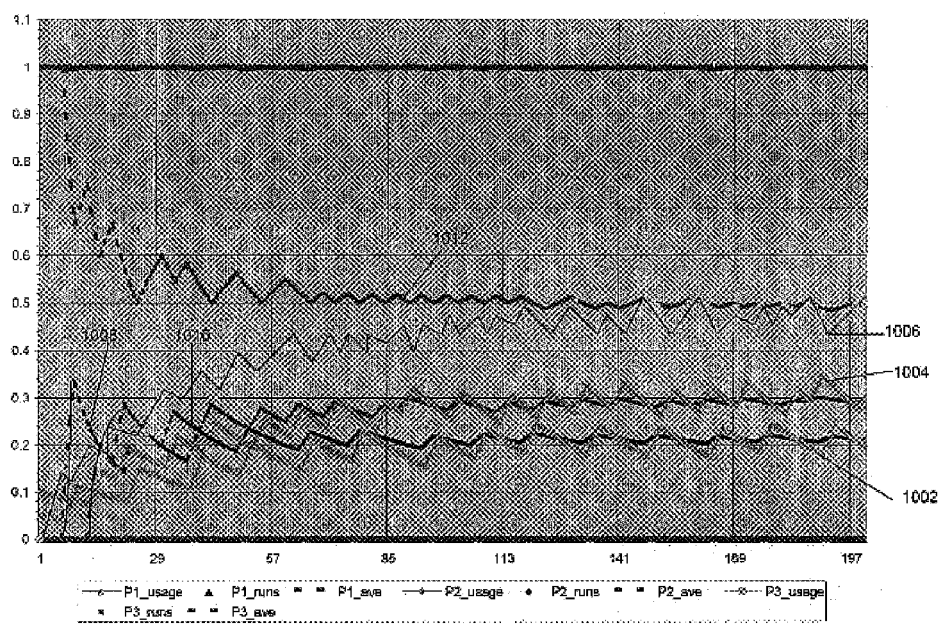
FIG. 10 is a usage metric curve chart showing a family of moving averages made with calculations using an aspect of the invention.

The Usage Metric curves in FIG. 10 show a family of estimates of the moving average made with the calculation that an aspect of the invention uses. The parametric Usage Metric curves show a family of estimates of the usage moving average made with the calculation above mentioned method. The general form of the usage scaler is:

$$x_m = x_l \alpha^{m-l} + (1-\alpha^n), m \geq l, 0 \leq n \leq m-l$$

to derive the estimate at time m from an earlier estimate at time l if n units of usage were received at times m-n+1 (n>0) through m and no usage received at times l+1 through m-n (n<m-l). This formula is derived from the application of a Kalman filter to estimate the scalar x, the parameter $\alpha$ determines the response time of the filter; the value $\ln(0.5)/\ln(\alpha)$ is termed the half life response time of the filter. The three Usage Metric curves in FIG. 10 are for $\alpha$ of 0.6 (1002), 0.85 (1004), and 0.95 (1006) with respective half lives of approximately 1.4, 4.27, and 13.5, and their corresponding respective actual run usage plots shown in curves 1008 1010 and 1012.

Figure 11:
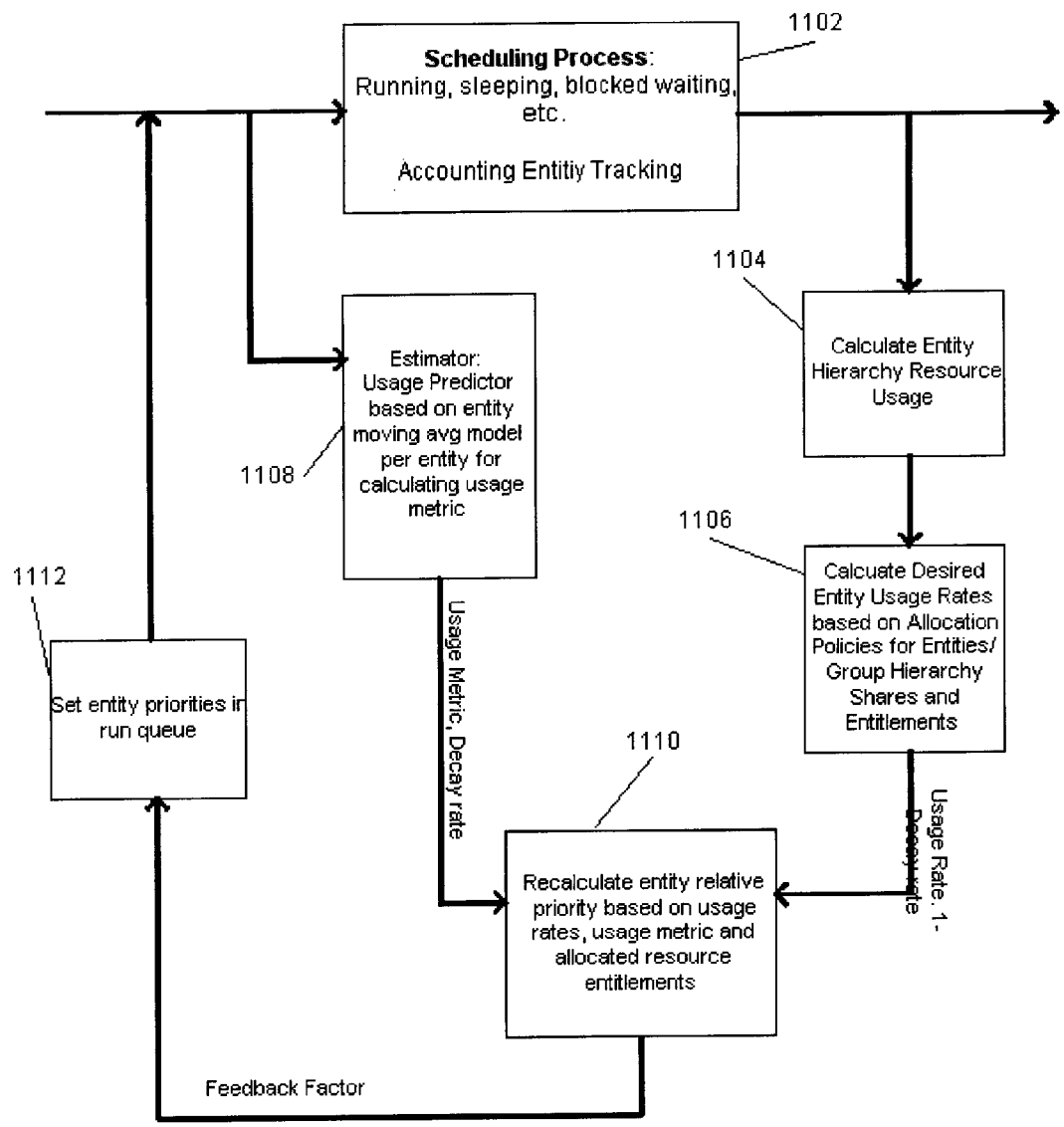
FIG. 11 shows the Kalman active feedback loop that an aspect of the invention scheduler uses to calculate the relative priorities of run queue entities.

FIG. 11 shows the Kalman active feedback loop that the scheduler uses to keep the relative priorities of all entities at precisely the optimal levels. This approach achieves usage levels that smoothly and efficiently reach optimal bandwidth usage and allotment by controlling the scheduled entities 1102 requesting various resource bandwidth. The controller process also includes the accounting entity tracking function which logs the usage of resources for each entity.

The first stage in the active feedback loop 1104 is the component which provides the means to calculate an entity's usage as the number of the resource's indivisible units that a particular entity is receiving per unit of time, that is a number between zero and the number of indivisible units that are available for consumption at each indivisible instant of time.

The next high level element 1106 provides means to calculate the entity's entitlement as a ratio of the product of the number of indivisible units that are available for consumption at each indivisible instant of time and the number of shares held by that entity at that time, to the total number of shares held by all live entities at that time, that is a number between zero and the number of indivisible units that are available for consumption at each indivisible instant of time. The entity entitlements and share policies are managed in tiers which are associated with the entity hierarchy such that allocation policies can be more equitably applied at tier levels corresponding to the entity hierarchy levels and anticipated usage levels. Entity entitlements are based on shares used, shares issued, policy settings for resource bandwidth and reservations, number of CPU's online, adjustment scales.

Another aspect of the invention in the feedback loop 1108 provides a means for measuring past demand usage and estimating future scheduled usage via the Kalman filter component. The Kalman filter generates a single variable measurement of estimated future usage for each entity from the entire entity hierarchy using the moving average model mentioned above. The moving average model is described in detail above with reference to FIGS. 9 and 10 above and is used to estimate the scalar x for the usage metric, the parameter $\alpha$ for the response time of the filter; and the filter half life response time of the filter as well as the usage metric.

Another aspect of the invention is shown by component 1110 which provides a means for recalculating the entity's priority, at instants of time when there are more active entities than there are units available for consumption, in ascending order of their ratio of usage to entitlement. These are then compared to desired usage ratios and adaptively mapped to process priorities in a stable feedback loop.

The foregoing variables and factors are used in mapping relative priority 1112 for processes in the process queue. The relative priority is used when allocating schedulable resources to a bandwidth resource consuming entity, such that relative priorities for entities as a result of the anticipated usage and entitlement of these entities having the same range of values are achieved.

Advantages of the Invention

The level of priorities at which to set processes according to past demands and allotted resource constraints are a critical factor in scheduling job mix of processes. Small changes in priorities may make big differences in system usage. Traditional Fair share schedulers attempt to track the historical usage and make adjustments to priorities based on that. This turns out to inadequate for various reasons, the biggest reason is that the priorities that are derived by these TS schedulers using these methods do not respond quickly enough to address the current usage adequately, generating lags between actual usage and measured usage.

An aspect of the invention uses an estimator function such as found in the Kalman filter, to track usage more closely and provides information about the future implications of usage through this estimator model. The speed of recovery gets increasingly better with the filter half-life. The use of the Kalman filter for measuring past demand usage and smoothing of future scheduled usage through setting of priorities provides the advantage of a dramatic increase in scheduler performance. The Kalman filter, in accordance with an aspect of the invention, generates single variable measurement of estimated usage, then it compares that to desired usage and adaptively maps processes to priorities in a stable feedback loop. This provides the advantage that processes are allocated the bandwidth component resources they need and are entitled to more precisely and in the most efficient time frame.

Conventional Fair Share schedulers use only very approximate methods to measure historical usage. Kay &

Lauder type Fair Share schedulers traditionally employ a bandwidth usage half-life to decay process priority. This is inadequate to anticipate the future priorities for processes. In contrast, an aspect of the invention employs usage half-life to decay historic usage values for input to calculating and setting process priorities so that the usage is more in line with set resource usage rates.

Another problem is that Fair Share schedulers such as those of Kay and Lauder use constraint bounds to keep processes from overshooting or undershooting their load bounds. The bounds are too constrictive and the algorithm is numerically unbounded. An aspect of the invention provides the advantage of a numerical scheme which is stable and bounded, providing little or no overshoot or undershoot. Thus, the system being scheduled need not retain excess margin to account for the too high too low swings in process usage. The added benefit here is that a smaller computer system running the invention algorithm can be used to satisfy demand to the same degree as a larger system running a less efficient scheduler.

Meaningfully optimal control of any system is predicated on the fact the necessary calculations must be accomplished within a time interval dictated by the system dynamics. Conventional fair share schedulers generally make the mistake of applying this loosely.

An aspect of the invention manages a tighter control of load or usage, operating more efficiently and providing optimal use of resources. This tighter control provides a more even result and a more full use of all bandwidth component resources in the system because there are fewer losses from speeding up and slowing down. Thus, usage as a function of time is smoother. This advantage may be expanded to any resource allocation model managing bandwidth type resources. The tight load following characteristics achieved by the foregoing aspects of the invention enable users, applications and processes to be guaranteed a percentage of CPU time or other selected bandwidth resources.

Another advantage provided by the invention is that it prevents particular parts of the workload on a system from saturating a service to the exclusion of other parts, unless it is deemed to be more important and allocated more shares. Thus, some consumers can be guaranteed a specific absolute rate of access to a service if deemed necessary. The invention also enables the scheduler to smooth out work load from among a varied job mix in such a manner as to reduce resource waste, while meeting demand with a quicker and more equitable response.

Appendix A shows Universal Modeling Language (UML) Diagrams of the detailed design of a scheduler according to an aspect of the invention.

While this invention has been described and illustrated with reference to the foregoing particular embodiments, it will be readily apparent to those skilled in the art that the scope of the present invention is not limited to the disclosed embodiments, but on the contrary, is intended to cover various other modifications and equivalent arrangements included within the spirit and scope of the following claims.

For example, a scheduler as described herein can be implemented for various different kinds of computing applications for management of bandwidth or time based resources, such as PDA's, cell phones as well as other wireless applications. The scheduler according to the invention also enables organizations to move applications which currently have their own dedicated systems on to one large system, while ensuring that no application will be able to dominate the new system to the disadvantage of the others. Another area where this capability is useful is in large ISPs where it is necessary to ensure that resource use is fairly shared among clients according to the level of service that they have purchased. By improving resource allocation, it is possible to generate more usage out of a computing system, thereby providing a way for a smaller computing system to meet the demand of a larger computing system employing a less efficient scheduler.

Therefore, persons of ordinary skill in this field are to understand that all such equivalent arrangemts and systems are included within the spirit and scope of the following claims.

What is claimed is:

1. A bandwidth resource scheduler executing in a digital device using active feedback for determining the relative priority to be used when allocating schedulable resources to a resource consuming entity with allocated shares of the bandwidth resource, said scheduler comprising:

means for calculating bandwidth resource usage wherein the number of the bandwidth resource's indivisible units that the resource consuming entity is receiving per unit of time, is a number between zero and the number of indivisible units that are available for consumption at each indivisible instant of time; and means for calculating entitlements of the resource consuming entity as a ratio of the product of the number of indivisible units that are available for consumption at each indivisible instant of time and the number of shares held by that entity at that time, to the total number of shares held by all live entities at that time, to provide a number between zero and the number of indivisible units that are available for consumption at each indivisible instant of time, and means for recording past demand usage and for estimating future usage by calculating a single variable metric based on the recorded past usage; and active feedback loop responsive to said single variable metric calculated for each said entity and responsive to said calculated entitlements of each said resource consuming entity for calculating relative priorities of each resource consuming entity, such that priorities for the resource consuming entities are calculated and mapped to entities in a scheduler entity run queue.

2. A system as in claim 1 wherein the single variable metric is calculated using a moving average model for the estimation of future usage.

3. A system as in claim 2 wherein the moving average model comprises a numerical scheme which is numerically stable and bounded, providing little or no overshoot or undershoot while scheduling multiple resource consuming entities in an entity hierarchy allocating bandwidth resources and thereby generating an aggregate usage load with multiple shared resources.

4. A system as in claim 1 wherein entitlements are derived by creating hierarchies of entities such that access to bandwidth resources is distributed in a tiered policy fashion of allocating shares and reservations to resource consuming entities rather than a direct linear resource allotment to of the bandwidth to a user.

5. A bandwidth resource scheduler executing in a digital device using active feedback for determining the relative priority to be used when allocating schedulable resources to a resource consuming entity, said scheduler comprising:

means for calculating a stable metric based on an estimate of a moving average of the resource sharing entity's usage; and means for calculating the entitlements of the resource sharing entities under selected resource sharing policies; and means responsive to said stable metric for matching an entities usage of said bandwidth resources with its entitlement to said bandwidth resources to derive relative priority of the resource sharing entities, such that priorities for entities as a result of the usage, anticipated usage and entitlement can be calculated and adaptively mapped to entities in a scheduler entity run queue.

6. System as in claim 5 using time averaging techniques for calculating said well behaved usage metrics.

7. A scheduler executing in a digital device using active feedback for determining the relative priority for scheduled resource consuming entities in entity hierarchies comprising:

means for providing entity hierarchies comprised of users, projects, groups and process groups; and means for providing allocation policies for short term, long term or both short and long term usage requirements for the resource consuming entities on a running system; and means for dynamic classification and scheduling of said entities in said resource consuming entity hierarchies according to said resource allocation policies such that resource sharing at the process level provides flexible higher granularity of resource sharing and a higher aggregate usage of bandwidth resources.

\* \* \* \* \*